United States Patent [19]

Iwasaki et al.

[11] Patent Number: 4,960,582

[45] Date of Patent: Oct. 2, 1990

[54] PROCESS FOR PRODUCING MICROCRYSTALLINE CO/TI-SUBSTITUTED BARIUM FERRITE PLATELETS

[75] Inventors: Susumu Iwasaki; Shigefumi Kamisaka; Iwao Yamazaki; Tutomu Hatanaka, all of Osaka, Japan

[73] Assignee: Sakai Chemical Industry Co., Ltd., Osaka, Japan

[21] Appl. No.: 387,965

[22] Filed: Aug. 1, 1989

[30] Foreign Application Priority Data

Aug. 4, 1988 [JP] Japan ................................ 63-195888

[51] Int. Cl.$^5$ .............................................. C01G 49/06
[52] U.S. Cl. ...................................... 423/632; 423/634
[58] Field of Search ................................ 423/632, 634

[56] References Cited

U.S. PATENT DOCUMENTS 4,404,254 9/1983 Franz .................................. 423/632
4,863,834 9/1989 Tanihara ............................. 423/632

Primary Examiner—Peter D. Rosenberg
Attorney, Agent, or Firm—Wenderoth, Lind & Ponack

[57] ABSTRACT

A process of producing a spinel structure Ni/Zn ferrite-modified, Co/Ti-substituted microcrystalline barium ferrite platelets having an average particle size of 0.03–0.15 $\mu$m, a temperature coefficient of coercive force of not more than +1 Oe/° C., including small absolute values in negative region, and a saturated magnetization of not less than 56 emu/g, which comprises: forming substantially amorphous preecursors of Co/Ti-substituted barium ferrites; adding an aqueous solution of nickel salts to the dispersion of the precursors of Co/Ti-substituted barium ferrites, and subjecting the slurry to hydrothermal reaction, thereby to provide precursors of spinel structure nickel ferrite-modified, Co/Ti-substituted barium ferrites; depositing a water insoluble zinc compound on the precursors; and calcining the precursors in the presence of barium chloride, washing the calcined products to remove therefrom the barium chloride, and drying.

6 Claims, No Drawings

PROCESS FOR PRODUCING MICROCRYSTALLINE CO/TI-SUBSTITUTED BARIUM FERRITE PLATELETS

This invention relates to a process for producing microcrystalline Co/Ti-substituted barium ferrite platelets, more particularly to microcrystalline spinel structure Ni/Zn-modified, Co/Ti-substituted barium ferrite platelets having an average particle size of about 0.03–0.15 μm, a temperature coefficient of coercive force of not more than +1 Oe/°C., including small absolute values in the negative region, and a saturated magnetization of not less than 56 emu/g.

Microcrystalline Co/Ti-substituted barium ferrite platelets represented by the general formula of BaO.n-(Fe$_{12-2x}$Co$_x$Ti$_x$O$_{18}$) have been extensively investigated to utilize them as magnetic powder for high performance magnetic recording media which have magnetic coatings of the powder thereon.

There are already many methods to produce the microcrystalline metal-substituted barium ferrite platelets, among which, for example, wet methods are described in Japanese Patent Application Laid-open No. 56-160328 and No. 61-168532. The latter describes a wet method in which an aqueous alkaline solution which has a pH of not less than 12 and contains Ba ions, Fe (III) ions and ions of substituent elements in a molar ratio in conformity with the aforesaid general formula is heated at temperatures of 150°–300° C., thereby to precipitate precursors of metal-substituted barium ferrites; the precursors are then calcined at temperatures of 700°–1000° C. in the presence of water soluble barium halides such as barium chloride; and then the barium chloride is removed from the calcined products by washing them with water, thereby to provide microcrystalline, well-defined hexagonal barium ferrite platelets of a particle size substntially in the range of 0.05–0.5 μm.

A typical barium ferrite represented by the formula of BaO.6Fe$_2$O$_3$ has a coercive force usually of 3000–6000 Oe, too high to apply the powder to magnetic recording use, but such metal-substituted barium ferrite as described hereinbefore has a coercive force of 200–2000 Oe suitable for use in magnetic recording by selecting degree of substituting Co and Ti for Ba. However, the known metal-substituted barium ferrite has a tendency for the coercive force to increase as temperature increases. This results in the fact that even when strength of magnetic field from magnetic heads is controlled so that an optimum magnetic recording is attained on magnetic recording media, no optimum magnetic recording is attained under the magnetic field from the magnetic heads when the ambient temperature increases to increase the coercive force of the barium ferrite powder. The erasability or overwriting properties are also not sufficient.

In general, the change of coercive force derived from temperature change is expressed by temperature coefficient of coercive force, $C_T$, which is defined by:

$$C_T = \frac{Hc_2 - Hc_1}{t_2 - t_1}$$

wherein Hc$_1$ and Hc$_2$ are coercive forces at temperatures of $t_1$ (°C.) and $t_2$ (°C.), respectively, provided that $t_1$ and $t_2$ are temperatures of not more than 100° C., and $t_1$ is smaller than $t_2$.

The known conventional metal-substituted barium ferrite has a $C_T$ in the range of +2 to +5 Oe/°C. Contrary to this, the range of $C_T$ generally accepted as being suitable for magnetic recording material is from +1 to −2 Oe/°C.

Thus, there has been proposed a method of reducing such temperature dependence of coercive force of the metal-substituted barium ferrite, for instance in Japanese Patent Application Laid-open No. 62-132732, in which metal-substituted barium ferrite is formed so as to have an axial ratio of not less than 5, the axial the ratio being defined as ratios of a maximum diagonal length of hexagonal platelets to thickness of the platelets. A further method is diclosed in Japanese Patent Application Laid-open No. 61-152003 in which Fe(II) ions are contained in barium ferrites.

On the other hand, a method has also been proposed to improve dispersibility of metal-substituted barium ferrite by heating under strong alkaline conditions an aqueous slurry of barium ferrites in the presence of metal ions which form spinel structure oxides, Fe(II) ions and nitrate ions, thereby to coat the barium ferrites with spinel structure ferrites, as disclosed in Japanese Patent Application Laid-open No. 62-265122 and No. 62-265123.

It is an object of the invention to obviate the above mentioned problems involved in the conventional known microcrystalline metal-substituted barium ferrite powders for use as magnetic recording materials, and to provide a process of microcrystalline spinel structure Ni/Zn ferrite-modified, Co/Ti-substituted barium ferrite platelets having an average particle size of 0.03–0.15 μm, a temperature coefficient of coercive force of not more than +1 Oe/°C., including small absolute values in the negative region, preferably in the range of +1 to −2 Oe, and a saturated magnetization of not less than 56 emu/g.

In accordance with the invention, there is provided a process of producing a spinel structure Ni/Zn ferrite-modified, Co/Ti-substituted microcrystalline barium ferrite platelets having an average particle size of 0.03–0.15 μm, a temperature coefficient of coercive force of not more than +1 Oe/°C., including small absolute values in negative region, and a saturated magnetization of not less than 56 emu/g, which comprises:

(a) a first step of adding an alkali to an aqueous solution which contains Ba ions, Fe(III) ions, Co ions and Ti ions in a molar ratio in conformity with the general formula of:

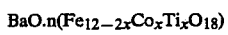

BaO.n(Fe$_{12-2x}$Co$_x$Ti$_x$O$_{18}$)

wherein n is a numeral of 0.8–1.0 and x is a numeral of 0.5–1.0, thereby to form coprecipitates, and then heating the dispersion of the coprecipitates at a pH of not less than 12 at temperature of not less than 60° C. under normal pressure, thereby to provide substantially amorphous precursors of Co/Ti-substituted barium ferrites;

(b) a second step of adding an aqueous solution of nickel salts in amounts of one to four times in moles the amount of the Ba ions, to the dispersion of the precursors of Co/Ti-substituted barium ferrites, and subjecting the slurry to hydrothermal reaction at temperature of 150°–300° C., thereby to provide precursors of spinel structure nickel ferrite-modified, metal-substituted barium ferrites which have dual phases of magnetoplumbite structure barium ferrites and spinel structure nickel ferrites;

(c) a third step of depositing a water insoluble zinc compound in amounts of 0.2 to 1.0 times in moles the amount of the Ba ions on the precursors of the dual phase barium ferrites; and (d) a fourth step of calcining the precursors of barium ferrites having the water insoluble zinc compounds deposited thereon in the presence of barium chloride at temperatures of 800°-950° C., and then washing the calcined products to remove therefrom the barium chloride.

Herein the specification, the particle size is defined as length of the longest diagonals on hexagonal platelets.

According to the process of the invention, as a first step, an alkali is added to an aqueous solution which contains Ba ions, Fe(III) ions, Co ions and Ti ions in a molar ratio in conformity with the general formula, thereby to form coprecipitates thereof, and then the slurry of the coprecipitates is heated at a pH of not less than 12 at temperature of not less than 60° C. under normal pressure, thereby to provide substantially amorphous precursors of Co/Ti-substituted barium ferrites.

It is necessary in the preparation of the aqueous solution which contains the specific ions as described above, that the ions are used in a molar ratio in conformity with the aforesaid general formula. If either value of n or x in the formula is outside the before specified range, there is not obtained microcrystalline Co/Ti-substituted barium ferrite platelets of small temperature coefficients of coercive force as described hereinbefore even after the second through fourth steps have been carried out.

The aqueous solutions may be prepared by forming aqueous solutions of each ion of the ions, respectively, and then the solutions are mixed together so that the each ions are contained therein in amounts as specified. Then, an alkali, usually in the form of aqueous solutions, is added to the solutions of the ions to form coprecipitates.

Water soluble compounds are used to prepare the aqueous solutions of each ion of the ions, such as nitrates, perchlorates, chlorates, halides or sulfates, or organic acid salts, depending upon the ions used. Thus, such water soluble compounds of the ions include, for example, nitrates such as barium nitrate, ferric nitrate, cobalt nitrate or titanium nitrate; perchlorates such as barium perchlorate, ferric perchlorate, cobalt perchlorate or titanium perchlorate; chlorates such as barium chlorate, ferric chlorate or cobalt chlorate; chlorides such as barium chloride, ferric chloride, cobalt chloride or titanium tetrachloride; fluorides such as ferric fluoride, cobalt fluoride or titanium fluoride; acetates such as barium acetate, ferric acetate or cobalt acetate; and sulfates such as cobalt sulfate or titanium sulfate.

It is necessary that the aqueous alkaline dispersion which contains the coprecipitates has a pH of not less than 12. When the dispersion has a pH of less than 12, it is difficult to obtain microcrystalline barium ferrite platelets of not more than 0.15 $\mu$m in an avarage particle size. It is in particular preferred that the dispersion has a pH of not less than 13. There may be preferably used strong alkalis such as sodium hydroxide, potassium hydroxide or lithium hydroxide to make the dispersion alkaline.

The alkaline dispersion is heated at temperature of not less than 60° C., preferably from 80° C. to boiling temperature under normal pressure, over a period usually of several tens of minutes to several hours.

The precursors of Co/Ti-substituted barium ferrites thus obtained has the composition in conformity with the aforesaid general formula, but is found amorphous from the standpoint of X-ray diffraction.

Then, as the second step, an aqueous solution of nickel salts in amounts of one to four times in moles the amount of the Ba ions is added to the slurry of the precursors of Co/Ti-substituted barium ferrites, preferably at elevated temperatures, for example at 60°-100° C., and then the slurry is subjected to hydrothermal reaction at a pH of not less than 12, preferably of not less than 13, at temperature of 150°-300° C., to deposit spinel structure nickel ferrites on the particles of the precursors of Co/Ti-substituted barium ferrites, thereby to provide precursors of spinel structure nickel ferrite-modified, Co/Ti-substituted barium ferrites.

The second step is one of the most important steps in the process of the invention, since temperature coefficients of coercive force of finally obtained Co/Ti-substituted barium ferrites can be limited to a small range of not more than +1 Oe/°C., including negative values, with substantially no decrease in saturated magnetization, by subjecting the precursors of barium ferrites to hydrothermal reactions in the presence of water soluble nickel ions. On the contrary, when coprecipitates are formed in the presence of nickel ions in the first step, and the coprecipitates are subjected to hydrothermal reactions, there takes place a substantial decrease in saturated magnetization of finally obtained barium ferrites, and hence no microcrystalline barium ferrite platelets are obtained which are suitable for use as high performance magnetic recording materials.

The nickel salts used are not specifically limited, but there may be preferably used, for example, inorganic salts such as nickel nitrate, nickel perchlorate, nickel chlorate, nickel chloride or nickel sulfate. However, organic acid salts such as nickel acetate may also be used, if desired. The nickel salts are used in amounts of one to four times in moles the amount of the Ba ions. When the amount of the nickel salts is less than equimolar to the Ba ions, the resultant barium ferrites still have a large temperature coefficient of coercive force, whereas when the amount of the nickel salts is more than four times the amount of the Ba ions, the resultant barium ferrites have a large absolute value of temperature coefficient in negative region as well as a small saturated magnetization.

The hydrothermal reaction is carried out in a closed reaction vessel like autoclaves by heating the slurry of the precursors of barium ferrites together with the nickel salts at temperature of 150°-300° C., usually for several tens of minutes to several hours, although not limited thereto.

The precursors of spinel structure nickel ferrite-modified, Co/Ti-substituted barium ferrites obtained in the second step are found to show dual phase X-ray diffraction pattern of magnetoplumbite structure barium ferrites and spinel structure nickel ferrites. However, the precursors are found small in saturated magnetization, so that they can not be used as high performance magnetic recording materials.

As described in a copending application of the same applicant, when the precursors of spinel structure nickel ferrite-modified barium ferrites are calcined in the presence of barium chloride at temperature of 800°-950° C., and then the calcined products are washed with water to remove therefrom the barium chloride, the precursors provide spinel structure nickel ferrite-modified, metal-substituted barium ferrites which have an average particle size of 0.03-0.15 $\mu$m and a temperature coefficient of coercive force of not less than $+1$ Oe/°C. However, the thus obtained spinel structure nickel ferrite-modified, metal-substituted barium ferrites have been found to have a saturated magnetization in the range of 50–55 emu/g, so that it is further desired that the saturated magnetization is increased to realize a higher output in high performance magnetic recording.

The inventors have therefore made further investigations to increase saturated magnetization of the spinel structure nickel ferrite-modified, metal-substituted barium ferrites while maintaining the above average particle size of 0.03–0.15 μm and a temperature coefficient of coercive force of not more than $+1$ Oe/°C., and found that when water insoluble zinc compounds exemplified by zinc hydroxide are deposited on the particles of the precursors of spinel structure nickel ferrite-modified, metal-substituted barium ferrites; the precursors are then calcined in the presence of barium chloride at temperature of 800°–950° C. thereby to complete crystallization of the precursors to hexagonal in crystal forms; and the calcined products are washed with water to remove the barium chloride therefrom, and then dried and calcined, to provide such desired barium ferrites of a higher saturated magnetization.

It is not necessarily clear why such spinel structure Ni/Zn-ferrite-modified, Co/Ti-substituted barium ferrites of a high saturated magnetization are obtained by depositing water insoluble zinc compounds on the particles of precursors of spinel structure nickel ferrite-modified, Co/Ti-substituted barium ferrites, prior to the calcination of the precursors in the presence of barium chloride. However, the X-ray diffraction pattern of the obtained barium ferrites consists of a spinel phase and a magnetoplumbite phase, so that it is likely that zinc in the water insoluble zinc compounds diffuses into the spinel structure nickel ferrite to form spinel structure Ni/Zn ferrite solid solutions, thereby to form spinel structure Ni/Zn ferrite-modified, Co/Ti-substituted barium ferrites.

Therefore, in accordance with the invention, as the third step, water insoluble zinc compounds in amounts of 0.2–1.0 times in moles as much as the amount of the Ba ions, are deposited on the particles of precursors of spinel structure nickel ferrite-modified Co/Ti-substituted barium ferrites. When the amount of the zinc compound deposited is less than 0.2 times in moles the Ba ions, the resultant barium ferrites are of a still small saturated magnetization, whereas when the amount of the zinc compound deposited is more than the amount equal in moles to the Ba ions, the resultant barium ferrites are improved in saturated magnetization, but are of an average particle size of more than 0.15 μm.

To deposit water insoluble zinc compounds on the particles of precursors of spinel structure nickel ferrite-modified, Co/Ti-substituted barium ferrites, the particles are dispersed in an aqueous solution of Zn ions, such as zinc chloride, zinc sulfate or zinc acetate, at a pH of 4–12, preferably of 8–10. The resultant water insoluble zinc compounds may be zinc hydroxide, zinc carbonate or basic zinc carbonate.

More specifically, precursors of spinel structure nickel ferrite-modified, Co/Ti-substituted barium ferrites are dispersed in water, and there are added thereto aqueous solutions of water soluble zinc compounds, followed by the addition of aqueous solutions of alkalis such as sodium hydroxide to the resultant dispersion to put the dispersion to a pH of 4–12, preferably of 8–10, so that water insoluble zinc hydroxide is deposited on the particles. Alternatively, when sodium carbonate is used in place of sodium hydroxide, to put the dispersion to a pH of about 7, water insoluble zinc carbonate, basic zinc carbonate or zinc hydroxide, or more likely, mixtures of these, are deposited on the particles.

As the fourth step, the precursors of spinel structure nickel ferrite-modified, metal-substituted barium ferrites having water insoluble compounds deposited thereon are then calcined in the presence of barium chloride, so that the crystallization of the precursors to hexagonal crystals is completed while preventing sintering of the particles of the precursors of barium ferrites to each other during the calcination. Thus, after the calcination and removal of the barium chloride from the calcined products by washing them with water provide microcrystalline, well defined hexagonal platelets of spinel structure Ni/Zn ferrite-modified, Co/Ti-substituted barium ferrites of average particle size of 0.03–0.15 μm.

In more detail, according to the process of the invention, the barium chloride separates the particles of the precursors from each other and dilutes the particles so as to prevent the sintering of the particles to each other, but also acts as calcination assistants so that the precursors grow to well-defined hexagonal platelets, and also as assistants to accelerate the diffusion of zinc into the spinel structure nickel ferrite. As results, the individual precursor particles complete crystallization substantially independently from the other particles, to provide microcrystalline, well-defined hexagonal platelets of spinel structure Ni/Zn ferrite-modified, Co/Ti-substituted barium ferrites.

The barium chloride is used in amounts of not less than about 50 parts by weight in relation to 100 parts by weight of the precursors of spinel structure Ni/Zn ferrite-modified, Co/Ti-substituted barium ferrites. When barium chloride is used in amounts of less than about 50 parts by weight in relation to 100 parts by weight of the precursors, the barium chloride dilutes the precursors only insufficiently so that the precursors sinter together to form large particles when being calcined. On the other hand, as is previously mentioned, since the barium chloride is removed from the calcined products by washing with water after the calcination, barium chloride may be used in a large excess to the precursors. However, the use of such a large excess amount of barium chloride needs much time to remove it from the calcined product, but also no special merit is expected. Therefore, the amount of barium chloride is preferably in the range of about 100–200 parts by weight in relation to 100 parts by weight of the precursors.

The precursors may be wet-mixed with barium chloride, dried, granulated or powdered if necessary, and then the mixture is calcined in an electric oven. However, the method of mixing and calcining is not restricted to any specific one.

The calcining temperature is preferably in the range of 800°–950° C. When the calcining temperature is less than 800° C., the crystallization of the precursors is so insufficient that the resultant spinel structure Ni/Zn ferrite-modified, Co/Ti-substituted barium ferrite powder is still unsatisfactory in magnetic properties. In particular, the powder is of a small saturated magnetization. When the calcining temperature is more than 950° C., the precursors are apt to sinter together in part in the calcination even in the presence of barium chloride. Thus, large particles of more than 0.15 μm in particle size are occasionally produced, which are not suitable for use as high performance magnetic recording materials. The most preferred calcining temperature in 800°–900° C.

As above set forth, in accordance with the process of the invention, there are obtained microcrystalline, well defined hexagonal platelets of spinel structure Ni/Zn ferrite-modified, Co/Ti-substituted barium ferrite particles having an average particle size of 0.03–0.15 μm, a temperature coefficient of coercive force of not more than +1 Oe/°C., including small absolute values in the negative region, preferably in the range of +1 to −2 Oe/°C., and a saturated magnetization of not less than 56 emu/g. The microcrystalline barium ferrite particles are thus suitably used as high performance magnetic recording materials.

The invention will now be described with reference to examples, however, the invention is not limited thereto.

EXAMPLE 1

An amount of 3667 ml of a 3.0 mole/l aqueous solution of ferric chloride, 1000 ml of a 1.0 mole/l aqueous solution of barium chloride, 500 ml of a 1.0 mole/l aqueous solution of cobalt chloride and 500 ml of a 1.0 mole/l aqueous solution of titanium tetrachloride were mixed together. The resultant solution was added to 7600 ml of a 15 mole/l aqueous solution of sodium hydroxide at 15°–20° C., to provide an aqueous dispersion having a pH of 14 and containing coprecipitates of hydroxides of Fe, Ba, Co and Ti. The dispersion was then heated at 100° C. for 4 hours under stirring, thereby to provide a slurry containing precursors of Co/Ti-substituted barium ferrites having compositions as represented by the formula of $BaO.(Fe_{11.0}Co_{0.5}Ti_{0.5}O_{18})$.

The precursors had the chemical compositions as above mentioned, but were found amorphous from X-ray diffraction study.

Then varied amounts of aqueous solutions of nickel chloride ($NiCl_2$), as shown in the Table 1, were added to the slurry of the precursors of Co/Ti-substituted barium ferrites at temperature of 100° C., to deposit nickel hydroxide on the particles of the precursors. The precursors were then heated at 250° C. for four hours in an autoclave, thereby to provide precursors of spinel structure nickel ferrite-modified, Co/Ti-substituted barium ferrites. The precursors were washed with water until the washings had a pH of not more than 8, and filtered to provide cakes of the precursors.

The thus obtained precursors of spinel structure ferrite-modified, Co/Ti-substituted barium ferrites showed dual phase X-ray diffraction patterns composed of magnetoplumbite structure barium ferrites and spinel structure nickel ferrites.

The precursors of spinel structure ferrite-modified barium ferrites were then dispersed in 10 liters of deionized water, and there were added thereto varied amounts of zinc chloride, as shown in the Table 1, and then either aqueous solutions of sodium hydroxide (Examples 1–6) or aqueous solutions of sodium carbonate (Example 7), to put the slurry to a pH of 7 so that water insoluble zinc hydroxide was deposited on the particles of the precursors. The precursors were washed with water and filtered, to provide cakes of precursors of spinel structure nickel ferrite-modified, Co/Ti-substituted barium ferrites having water insoluble zinc compounds deposited thereon.

An amount of 100 parts by weight of the precursors of spinel structure nickel ferrite-modified barium ferrites having water insoluble zinc compounds deposited thereon was wet mixed together with 100 parts by weight of barium chloride and water, and the mixtures were granulated into spheres of about 3 mm in diameter, and dried.

The dried spheres were calcined at 900° C. in an electric oven for 3 hours, crushed, and further wet powdered with a sand-grinder. Then the finely divided powder was washed with water to remove barium chloride therefrom, filtered, and dried, to provide microcrystalline spinel structure Ni/Zn ferrite-modified, Co/Ti-substituted barium ferrite powder.

Saturated magnetization ($\sigma$ s) and coercive force (iHc) of the barium ferrite powder were measured with a vibration magnetometer. Temperature coefficient of coercive force of the powder was calculated based on coercive force at varied temperatures. Average particle size of the powder was measured by means of through electron microphotographs of the powder. As apparent, the barium ferrite powder of the invention was found to have temperature coefficients of coercive force of not more than +1 Oe/°C. including small absolute values in negative region, and saturated magnetizations of not less than 56 emu/g.

REFERENCE EXAMPLES 1–6

Barium ferrite powders were prepared without depositing warter insoluble zinc compounds on the particles of spinel structure ferrite-modified barium ferrites or depositing warter insoluble zinc compounds on the particles in amounts other than the specified hereinbefore, and otherwise in the same manner as in the Example 1.

As the properties of the resultant barium ferrite were shown in the Tanble 1, the powders had saturated magnetization of less than 56 emu/g (Reference Examples 1–4), or average particle sizes of more than 0.15 μm (Reference Example 5).

The calcination was carried out at 970° C., and otherwise in the same manner as in the Example 1, to provide barium ferrite powder, which was found to have average particle sizes of more than 0.17 μm (Reference Example 6).

TABLE 1

| | Production Conditions | | | Magnetic Properties of Barium Ferrites | | | |
|---|---|---|---|---|---|---|---|
| | Ba/(Fe + Co + Ti) (molar ratios) | Amount of $NiCl_2$ (moles)(*) | Amount of $Zn^{2+}$ (moles)(*) | Temp. Coeff. of Coercive Force (Oe/°C.) | σs (emu/g) | iHc (Oe) | Average Particle Size (μm) |
| Example 1 | 1/12 | 1.0 | 0.2 | +0.70 | 56.0 | 450 | 0.05–0.07 |
| Example 2 | 1/12 | 1.0 | 0.5 | +0.90 | 62.0 | 575 | 0.05–0.07 |
| Example 3 | 1/12 | 1.5 | 0.5 | 0.00 | 61.0 | 550 | 0.05–0.07 |
| Example 4 | 1/12 | 1.5 | 1.0 | +0.50 | 62.0 | 460 | 0.07–0.10 |
| Example 5 | 1/12 | 2.0 | 0.5 | −1.00 | 59.0 | 465 | 0.03–0.06 |
| Example 6 | 1/12 | 3.0 | 0.5 | −1.50 | 57.0 | 350 | 0.03–0.06 |
| Example 7 | 1/12 | 1.5 | 0.5 | +0.03 | 61.2 | 560 | 0.05–0.07 |
| Ref. Example 1 | 1/12 | 1.0 | 0 | +0.80 | 55.0 | 810 | 0.05–0.07 |

TABLE 1-continued

| | Production Conditions | | | Magnetic Properties of Barium Ferrites | | | |
|---|---|---|---|---|---|---|---|
| | Ba/(Fe + Co + Ti) (molar ratios) | Amount of $NiCl_2$ (moles)(*) | Amount of $Zn^{2+}$ (moles)(*) | Temp. Coeff. of Coercive Force (Oe/°C.) | σs (emu/g) | iHc (Oe) | Average Particle Size (μm) |
| Ref. Example 2 | 1/12 | 1.5 | 0 | −1.20 | 54.0 | 700 | 0.05–0.07 |
| Ref. Example 3 | 1/12 | 3.0 | 0 | −2.00 | 50.0 | 590 | 0.03–0.06 |
| Ref. Example 4 | 1/12 | 1.5 | 0.1 | −1.10 | 55.0 | 680 | 0.05–0.07 |
| Ref. Example 5 | 1/12 | 1.5 | 1.5 | +0.70 | 63.0 | 420 | 0.15–0.20 |
| Ref. Example 6 | 1/12 | 1.5 | 0.5 | +0.05 | 63.0 | 700 | 0.17–0.22 |

Notes:
(*)Moles per mole of Ba ions

What is claimed is:

1. A process of producing a spinel structure Ni/Zn ferrite-modified, Co/Ti-substituted microcrystalline barium ferrite platelets having an average particle size of 0.03–0.15 μm, a temperature coefficient of coercive force of not more than +1 Oe/°C., including small absolute values in negative region, and a saturated magnetization of not less than 56 emu/g, which comprises:

(a) a first step of adding an alkali to an aqueous solution which contains Ba ions, Fe(III) ions, Co ions and Ti ions in a molar ratio in conformity with the general formula of:

$$BaO.n(Fe_{12-2x}Co_xTi_xO_{18})$$

wherein n is a numeral of 0.8–1.0 and x is a numeral of 0.5–1.0, thereby to form coprecipitates therof, and then heating the dispersion of the coprecipitates at a pH of not less than 12 at temperature of not less than 60° C. under normal pressure, thereby to provide substantially amorphous precursors of Co/Ti-substituted barium ferrites;

(b) a second step of adding an aqueous solution of nickel salts in amounts of one to four times in moles the amount of the Ba ions, to the dispersion of the precursors of Co/Ti-substituted barium ferrites, and subjecting the slurry to hydrothermal reaction at temperature of 150°–300° C., thereby to provide precursors of spinel structure nickel ferrite-modified, Co/Ti-substituted barium ferrites which have dual phases of magnetoplumbite structure barium ferrites and spinel structure nickel ferrites;

(c) a third step of depositing a water insoluble zinc compound in amounts of 0.2 to 1.0 times in moles the amount of the Ba ions on the precursors of the dual phase barium ferrites; and (d) a fourth step of calcining the precursors of barium ferrites having the water insoluble zinc compounds deposited thereon in the presence of barium chloride at temperatures of 800°–950° C., and then washing the calcined products to remove therefrom the barium chloride.

2. The process as claimed in claim 1 wherein the nickel salts are nickel chloride.

3. The process as claimed in claim 1 wherein the water insoluble zinc compounds are at least one of zinc hydroxide, zinc carbonate and basic zinc carbonate.

4. The process as claimed in claim 1 wherein barium chloride is used in amounts of not less than 50 parts by weight in relation to 100 parts by weight of the precursors.

5. The process as claimed in claim 1 wherein the dispersion has a pH of not less than 13.

6. The process as claimed in claim 1 wherein the dispersion is heated at temperatures between 80° C. and boiling temperature under normal pressure.

* * * * *